United States Patent
Hanyu et al.

(10) Patent No.: US 7,351,478 B2
(45) Date of Patent: Apr. 1, 2008

(54) HEAT-SEAL FILMS AND METHOD OF MANUFACTURE

(75) Inventors: Aiko Hanyu, Houston, TX (US); Scott D. Cooper, Humble, TX (US); Mark Miller, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/810,956

(22) Filed: Mar. 16, 2001

(65) Prior Publication Data

US 2002/0176974 A1 Nov. 28, 2002

(51) Int. Cl.
*B32B 27/08* (2006.01)
*B32B 7/12* (2006.01)
*C08F 210/00* (2006.01)
*C08F 10/00* (2006.01)

(52) U.S. Cl. ............... 428/516; 428/349; 526/348; 526/348.1; 526/942

(58) Field of Classification Search ........... 526/943, 526/348, 348.1, 351, 942; 428/515, 516, 428/523, 355 EN, 349, 348
See application file for complete search history.

(56) References Cited

U.S. PATENT DOCUMENTS

| | | | |
|---|---|---|---|
| 5,310,950 A | 5/1994 | Mannion | |
| 5,997,679 A | 12/1999 | Wheat et al. | |
| 6,090,325 A | 7/2000 | Wheat et al. | |
| 6,143,854 A * | 11/2000 | Bamberger et al. | 526/348.1 |
| 6,159,608 A | 12/2000 | Friedman | |
| 6,165,599 A | 12/2000 | Demeuse | |
| 6,583,227 B2 * | 6/2003 | Mehta et al. | 525/240 |
| 6,686,055 B2 | 2/2004 | Tanaka et al. | |
| 7,193,025 B2 * | 3/2007 | Maziers et al. | 526/351 |
| 2002/0004575 A1 * | 1/2002 | Cozewith et al. | 526/348 |

FOREIGN PATENT DOCUMENTS

| | | |
|---|---|---|
| DE | 19544709 | 6/1997 |
| DE | 19827327 | 12/1999 |
| EP | 0668157 | 8/1995 |
| EP | 0669348 | 8/1995 |
| EP | 0982328 | 4/2000 |
| EP | 1006149 | 6/2000 |
| EP | 1179562 | 2/2002 |
| JP | 9076431 | 3/1997 |
| JP | 11060833 | 3/1999 |
| JP | 11138716 | 5/1999 |

OTHER PUBLICATIONS

JP-11-060833, (Mar. 1999), Machine Translation of the Japanese Patent from the JPO web site.*
Complete Translation of JP 11-060833, (document dated 1999).*

* cited by examiner

*Primary Examiner*—Sheeba Ahmed
(74) *Attorney, Agent, or Firm*—Diane L. Kilpatrick-Lee (57) ABSTRACT

A heat-seal polymer film and method of forming such film is provided. The heat-seal film is formed from metallocene-catalyzed isotactic random copolymers of propylene and at least one other $C_2$ to $C_8$ alpha olefin, such as ethylene random. Such films show improved heat-seal characteristics, such as reduced seal initiation temperatures (SIT's) and improved heat-seal strength, as well as other improved properties.

25 Claims, 9 Drawing Sheets

HEAT-SEAL FILMS AND METHOD OF MANUFACTURE

BACKGROUND

Film packaging is commonly used today for many different products, such as food products. During the packaging of such products, the film layers of the product packaging are usually sealed together in some manner to close off the film packaging so that the package contents are effectively sealed within the film. The films used for such packaging are often formed from thermoplastic polyolefin resins, such as polypropylene. One means of sealing such materials is through the use of heat-seal films, layers or coatings. The heat-seal films are usually comprised of thermoplastic layers of resin that are coextruded or otherwise joined to a core layer or layers of the polymer film of the product packaging. The core layer(s) have a higher melting point than the heat-seal layer. Thus, when heat and pressure are applied to layers of the packaging film, the heat-seal layer is melted so that it forms a bond or seal to seal the layers of film together.

Heat-seal films are often characterized in terms of seal initiation temperature (SIT) and heat-seal strength. In commercial production of film packaging utilizing heat-seal films or layers, it is often desirable to reduce the amount of heat necessary to provide an effective seal without compromising the seal strength or integrity. By reducing the amount of heat necessary to seal film packaging, savings in energy as well as improvements in line speed and processability can be achieved.

Materials traditionally used for heat-seal films include polypropylene homopolymers, ethylene-propylene copolymers and ethylene-butene-propylene terpolymers formed from Ziegler-Natta catalysts. Ziegler-Natta catalysts are used in forming stereospecific polymers, particularly isotactic polymers. Isotactic polypropylene is one of a number of semi-crystalline polymers that can be characterized in terms of the stereoregularity of the polymer chain. The structure of isotactic polypropylene is characterized in terms of the methyl groups attached to the tertiary carbon atoms of the successive propylene monomer units lying on the same side of the main polymer chain. That is, the methyl groups are characterized as being all above or below the polymer chain. Isotactic polypropylene can be illustrated by the following formula:

(1)

As is known in the art, any deviation or inversion in the structure of the chain lowers the degree of isotacticity or crystallinity. This crystallinity distinguishes isotactic polymers from atactic polymers in which the methyl groups are randomly oriented along either side of the polymer chain and are non-crystalline and highly soluble in xylene. Although isotactic polypropylene is generally insoluble in xylene, a certain amount of polymer, which may be the result of chain defects within the polymer chain and low molecular weight chains, may be soluble in xylene, including those prepared with conventional Ziegler-Natta catalysts. In many instances, particularly in packaging used for food products, a high percentage of xylene solubles is undesirable and can even make the film unusable for certain applications.

Ziegler-Natta propylene-ethylene random copolymers have been and continue to be used in large volumes to produce heat seal films. Although these materials typically form films with good seal properties, good optical properties and comply with appropriate FDA guidelines, improvements are still desired. One characteristic associated with conventional Ziegler-Natta propylene-ethylene copolymers is that during the polymerization of such materials, the ethylene monomers are frequently inserted into the polymer chain in large ethylene groups or blocks instead of being inserted and distributed in a regular manner throughout the polymer chain as smaller segments or blocks. The presence of these larger ethylene blocks or segments in the polymer chain, especially in the lower molecular weight and/or atactic fraction, results in less efficient use of the comonomer and leads to higher levels of xylene solubles.

Heat-seal films having improved heat-seal characteristics, as well as other improved properties, such as low xylene solubles, are therefore desirable. It is therefore an object of the present invention to provide heat-seal films having such improved properties, as well as overcoming many of the disadvantages associated with prior art heat-seal films.

SUMMARY

A heat-seal polymer film is formed from a layer of film formed from a metallocene-catalyzed isotactic random copolymer of propylene and at least one other $C_2$ to $C_8$ alpha olefin, which can include ethylene and butene. The random copolymer may be a terpolymer of propylene, ethylene and butene. In one aspect of the invention, the at least one other $C_2$ to $C_8$ alpha olefin is present in the random copolymer in an amount of from about 0.5% to about 30% by weight, and may be present in an amount of from about 1% to about 15% by weight. The film may have a seal initiation temperature of from about 80° C. to about 125° C. defined at a seal strength of 200 g/inch and the random copolymer used for the film may have a DSC melting point temperature of less that about 150° C.

The film may be a cast film or an oriented film, and may have less than 2% haze and greater than 85% gloss at a 45° incident angle. The random copolymer used for the film may have a xylene solubles content of less than 5% by weight.

The heat-seal film may have an ultimate seal strength that is at least 30% greater than a heat-seal film prepared under similar conditions from a Ziegler-Natta-catalyzed isotactic random copolymer of propylene and the at least one other $C_2$ to $C_8$ alpha olefin, and may provide a hot-tack seal strength for cast films above 0.4 N/cm at a temperature range of from 60° C. to 130° C.

In another embodiment of the invention, a multi-layer polymer film is provided having a polyolefin core layer and at least one heat-seal layer formed from a metallocene-catalyzed isotactic random copolymer of propylene and at least one other $C_2$ to $C_8$ alpha olefin that is joined to the polyolefin core layer. The core layer and heat-seal layer may be coextruded together, and the heat-seal layer may have a thickness that is less than the thickness of the core layer. In one particular embodiment, the heat-seal layer has a thickness that is 20% or less than the thickness of the core layer.

In another aspect of the invention, a material for use in heat-seal applications is provided from a metallocene-catalyzed isotactic random copolymer of propylene and at least one other $C_2$ to $C_8$ alpha olefin, which can include ethylene and butene. The random copolymer may be a terpolymer of propylene, ethylene and butene. In still another aspect of the invention, the at least one other $C_2$ to $C_8$ alpha olefin is present in the random copolymer in an amount of from about 0.5% to about 30% by weight, and may be present in an amount of from about 1% to about 15% by weight. The random copolymer may provide a film having a seal initiation temperature of from about 80° C. to about 125° C. defined at a seal strength of 200 g/inch, and the random copolymer may have a DSC melting point temperature of less that about 150° C.

The material can provide a film having less than 2% haze and greater than 85% gloss at a 45° incident angle. The random copolymer may have a xylene solubles of less than 5% by weight.

The material may provide a heat-seal film having an ultimate seal strength that is at least 30% greater than a heat-seal film prepared under similar conditions from a Ziegler-Natta-catalyzed isotactic random copolymer of propylene and the at least one other $C_2$ to $C_8$ alpha olefin, and may provide a hot-tack seal strength for cast films above 0.4 N/cm at a temperature range of from 60° C. to 130° C.

In still another aspect of the invention, a method of forming a heat-seal film is provided. The method includes providing a metallocene-catalyzed isotactic random copolymer of propylene and at least one other $C_2$ to $C_8$ alpha olefin, and forming the random copolymer into a layer of film.

BRIEF DESCRIPTION OF THE DRAWINGS

For a more complete understanding of the present invention, and the advantages thereof, reference is made to the following descriptions taken in conjunction with the accompanying figures, in which.

DETAILED DESCRIPTION

In recent years, metallocene catalysts have been employed for producing stereospecific polymers. Metallocene catalysts are distinguishable from conventional Ziegler-Natta catalysts in many ways. Metallocene catalysts are single site catalysts, i.e. they provide only a single site where the polymerization reaction or linking of the monomers can take place. Ziegler-Natta catalysts, in contrast, are typically multi-site catalysts. As a result, metallocene catalysts usually provide polymer chains of similar length and tacticity, resulting in polymers having more narrow molecular weight distributions. In contrast, Ziegler-Natta different sites will produce different polymer chain lengths having different properties. Some sites of the Ziegler-Natta catalysts may produce more atactic polymer sequences than others. Additionally, with respect to the polymerization of isotactic propylene homopolymers, for example, the metallocene catalysts will exhibit certain region-type defects that are uniformly distributed along the polymer chain. These are often in the way of 2-1 insertions wherein the propylene monomers are inserted so that the pendant methyl groups are located on opposite sides of the polymer chain. This is distinguishable from the polymers prepared from conventional Ziegler-Natta catalysts, which exhibit almost no region-type defects. As a result of these characteristics, metallocene-catalyzed polymers often exhibit comparably lower melting points than those prepared with conventional Ziegler-Natta catalysts.

Metallocene catalysts are generally characterized as having two cyclopentadienyl rings attached to a transition metal, such as zirconium, titanium or hafnium. In particular, chiral, stereorigid metallocene catalysts have been found especially useful in polymerizing highly isotactic polyolefins. A chiral compound is one that is non-superimposable on its mirror image. Examples of such catalysts for producing isotactic polyolefins are disclosed in U.S. Pat. Nos. 4,794,096 and 4,975,403, which are herein incorporated by reference.

It has been found that random copolymers of propylene and at least one other $C_2$ to $C_8$ alpha olefin produced using metallocene catalysts useful in the polymerization of isotactic polyolefins produces films having improved heat-seal characteristics, as well as other improved film properties. As used herein, unless otherwise specified, the term "copolymer" shall be construed to mean the polymerization product of two or more different monomers polymerized at the same time. An example of those metallocene catalysts useful for preparing the random copolymers in the present invention may be described by the general formula:

R"($C_5R'_4$)$_2$MeQp          (2)

wherein ($C_5R'_4$) is a cyclopentadienyl or substituted cyclopentadienyl ring; R' is a hydrogen or a hydrocarbyl radical having 1-20 carbon atoms, and each R' may be the same or each may be different; R" connects the two ($C_5R'_4$) rings such that at least a portion of R" acts as a bridge between the two rings and makes the catalyst stereo-rigid; Me is a Group 4b, 5b, or 6b metal of the Periodic Table; Q is a halogen or is a hydrocarbyl radical having 1-20 carbon atoms; and $0 \leq p \leq 3$.

R' may be hydrogen or a hydrocarbyl radical. Examples of hydrocarbyl radicals useful as R' include alkyl, alkenyl, aryl, alkylaryl or arylalkyl radicals. More specifically, exemplary hydrocarbyl radicals include methyl, ethyl, propyl, butyl, amyl, isoamyl, hexyl, isobutyl, heptyl, octyl, nonyl, decyl, cetyl, phenyl, methylene, ethylene, propylene, and other like groups. The R's may be selected so that ($C_5R'_4$) is an indenyl radical (Ind) or a hydrated indenyl radical ($IndH_4$).

R" is a stable component that bridges the two ($C_5R'_4$) rings in order to render the catalyst stereo-rigid. R" may be organic or inorganic and may include groups depending from the portion acting as the bridge. Examples of R" include an alkylene radical having 1-4 carbon atoms, a silicon hydrocarbyl group, a germanium hydrocarbyl group, an alkyl phosphine, an alkyl amine, boron, nitrogen, sulfur, phosphorus, aluminum or groups containing these elements. The preferred R" components are methylene ($-CH_2-$), ethylene ($-C_2H_4-$), an alkyl silicon, and a cycloalkyl silicon, such as cyclopropyl silicon, among others. Similarly, Q may be any of the hydrocarbyl groups listed for R' above, but preferably, Q is a halogen, and most preferably, Q is chlorine. Also in the preferred embodiment, p=2.

The metallocene catalyst should be chiral. Chirality in a metallocene catalyst exhibits stereochemical control over the polymer product and produces a polymer with a high isotactic index. In addition, the catalyst should be stereo-rigid to aid in the stereochemical control of the polymerization.

The metallocene catalyst systems used for producing the films of the present invention may also include an aluminum compound in combination with the metallocene catalysts. Preferably, the aluminum compound is an alumoxane represented by the general formula (R—Al—O) for the cyclic form and R(R—Al—O—)$_n$—AlR$_2$ for the linear form. R is an alkyl group with preferably 1-5 carbons and n is an integer preferably from 1 to about 20. Most preferably, R is a methyl group. The aluminum compound may be a mixture of the linear and cyclic alumoxanes. Generally, in preparing alumoxanes a mixture of the cyclic and linear forms is obtained. The alumoxanes may be those prepared using any of the methods known in the art.

The random copolymers produced with isotactic metallocene catalysts may be prepared using those polymerization processes that are well known in the art. Examples of such polymerization processes include slurry, gas-phase, and liquid-bulk polymerization. The metallocene-catalyzed isotactic random copolymers of the invention are formed from propylene and at least one other $C_2$ to $C_8$ alpha olefin. Although ethylene and butene are the most commonly employed comonomer, other $C_2$ to $C_8$ alpha olefins may be used as well. The random copolymers may include copolymers of propylene-ethylene, propylene-butene, terpolymers of propylene-ethylene-butene, etc. In the present invention, the non-propylene $C_2$ to $C_8$ alpha olefin content of the random copolymers will typically make up from about 0.5% to about 30% by weight of the copolymer. For copolymers employing propylene and only one other $C_2$ to $C_8$ alpha olefin, the comonomer content will usually be from about 0.5% to 20% by weight of copolymer, with from about 1% to about 15% by weight of copolymer being typical, and with from about 1% to about 10% by weight being more typical.

Where two or more $C_2$ to $C_8$ alpha olefins are used as comonomers, such as in terpolymers, the total amount of the different non-propylene alpha olefins will typically be from about 0.5% to about 30%, and will usually not exceed 40% by weight of copolymer. The amount of the different non-propylene alpha olefins comonomers, where more than one comonomer is employed, will typically vary from about 0.5 to about 20% by weight of copolymer, with 0.5 to about 15% by weight of copolymer being more typical.

In one particular embodiment, ethylene is the preferred $C_2$ to $C_8$ alpha olefin comonomer wherein an isotactic propylene-ethylene random copolymer is formed. In such cases, the ethylene content will typically make up from about 0.5% to about 15% by weight of copolymer, with from about 1% to about 10% by weight being more typical, and from about 1 to about 8% by weight being still more typical.

The ethylene or other $C_2$ to $C_8$ alpha olefin comonomer is incorporated at random within the isotactic structure and pattern of the polypropylene. Because a metallocene catalyst is used to polymerize these materials, the ethylene or other alpha olefin is more uniformly and thoroughly distributed throughout the polymer chain. Because the metallocene is a single-site catalyst, the monomer incorporation and polymer tacticity will be more or less the same for all polymer chains produced. The Ziegler-Natta catalysts, in contrast, having multiple sites will have some sites that produce more atactic polymer sequences and/or sequences with larger comonomer blocks or segments, or multiple insertions of comonomer.

For the metallocene-produced copolymers, the insertion of the alpha olefin comonomers into the propylene-based polymer constitute further "defects" within the polymer chain, in addition to those region-defects discussed previously, which are commonly associated with metallocene catalysts. These defects, which are uniformly distributed, result in shorter crystallizable isotactic sequences, and thus favor the growth of thinner crystallites. The metallocene-produced copolymers also have less low molecular weight materials, and less atactic content relative to conventional Ziegler-Natta copolymers. This also results in a more efficient utilization of the alpha olefin comonomer and a lower melting point compared to conventional Ziegler-Natta catalyst-produced resins. Copolymers having a more narrow molecular weight distribution are also produced in comparison to those produced with conventional Ziegler-Natta catalysts.

The metallocene-catalyzed isotactic random copolymer will often further include minor amounts, usually less than 1% by weight of copolymer and more typically less than 0.5% by weight, of additives designed to enhance physical properties or improve processability. These additives may include anti-oxidants, acid neutralizers, lubricants, anti-blocking agents, etc., and are well known to those skilled in the art.

The films prepared from the metallocene-catalyzed isotactic random copolymers for use in heat-seal applications may be cast films or oriented films, which may include films oriented in one or more directions, such as blown films, calendared films, uniaxially oriented films and biaxially oriented films. These films may be prepared by any suitable technique known in the art.

In most applications, the heat-seal films of the present invention are used as layers or as components in multi-layer films. Typically, the heat-seal films will form at least one surface layer joined to a core layer or layers of the multi-layer films. As used herein, the phrase "core layer," although singular, may refer to one or more layers that form the core of the film. The core layer will typically be formed from a suitable polymer, such as a polyolefin, having desired properties or characteristics, such as good stiffness or barrier properties. The heat-seal films of the present invention have particular application with multi-layer polypropylene homopolymer and polypropylene copolymer core-layer films. Other materials, such as nylon, PET, etc. could also be used. The films may also be metallized or otherwise treated to enhance or impart certain properties. The heat-seal films could also be applied to other materials, such as paper or aluminum foil, through extrusion lamination or extrusion coating or the like.

The heat-seal layer will typically have a thickness that is substantially less than the thickness of the core layer and substantially less than the thickness of the total film structure. Usually the thickness of the heat-seal layer will be substantially less, usually less than 20%, of the thickness of the core layer. Film thickness will usually depend upon the type of film, such as cast films or oriented films. For most films, the core layer will typically have a thickness of from about 5 to about 150 microns, with the heat-seal layer thickness typically ranging from about 0.3 to about 80 microns in thickness.

The heat-seal layer is typically joined to the core layer by coextrusion. In coextrusion, the metallocene-catalyzed random copolymer used for the heat-seal layer is coextruded with the polymer forming the core layer through various die systems to form a film, depending upon the processing equipment. Additional layers can also be coextruded with these layers. For example, a heat-seal layer can be joined to both surfaces of the core layer by coextrusion, with the core layer being sandwiched between. Other layers serving different functions, such as barrier layers, could also be coextruded and incorporated into the film. Although coextrusion of the heat-seal layer with the core layer is usually employed to join the heat-seal layer to the core layer, other methods could be used as well. For example, the heat-seal layer could be extrusion coated or extrusion laminated later in the film making process.

For oriented films, such as biaxially oriented films, the films may undergo further processing after extrusion. In biaxially oriented films, after extrusion, the film is stretched in a longitudinal or "machine" direction and in a transverse direction to arrive at a film that can be characterized by its orientation or stretch ratios. Such orientation of films is well known to those skilled in the art.

It has been discovered that metallocene-catalyzed random copolymers have certain properties that make them beneficial for use in heat-seal film applications. Such heat-seal films exhibit seal initiation temperatures (SIT's) of less than 125° C. defined at a strength of 200 g/inch (0.77 N/cm), with SIT's of from 80° C. to 125° C. being obtainable, 90° C. to 125° C. being more readily obtainable and from 100° C. to 125° C. being still more readily obtainable, all defined at a strength of 200 g/inch. Furthermore, such heat-seal film resins exhibit differential scanning calorimeter (DSC) melting points of less than 150° C., with from about 90° C. to about 135° C. being obtainable, from about 100° C. to about 135° C. being readily obtainable, and from about 110° C. to about 135° C. being more readily obtainable. SIT's measured and presented herein for cast films were taken using a sealing pressure of 60 psi with a dwell time of 1 second. For the oriented films, a sealing pressure of 20 psi and a dwell time of 0.5 seconds were used.

The heat-seal films of the invention also exhibit improved heat-seal strength. Heat-seal strength is often measured in terms of "hot-tack" performance. Hot tack refers to the strength of the semi-molten seal at the interface between two film surfaces. The heat-seal cast films of the invention exhibited a hot-tack seal strength above 0.4 N/cm at a temperature range of from 60° C. to 130° C., with a hot-tack strength above 0.4 N/cm at a temperature range of from 80° C. to 130° C. being more readily obtainable, and a hot-tack strength of from 100° C. to 130° C. being still more readily obtainable. The oriented heat-seal films of the invention exhibited hot-tack seal strengths above 0.5 N/m at a temperature range of from 75° C. to 135° C. At temperatures of from 80° C. to 135° C., the oriented heat-seal films exhibited hot-tack seal strengths generally above 0.8 N/m. Hot-tack measurements presented herein for cast films were taken at a sealing pressure of 60 psi with a dwell time of 1 second and a 250 millisecond (ms) delay. For the oriented films a sealing pressure of 20 psi, with a dwell time of 0.5 seconds and a 250 ms delay, was used.

Another improvement observed in the isotactic metallocene-random copolymers used as heat-seal materials is in the ultimate or plateau seal strength. This ultimate seal strength or plateau is typically seen as a function of seal temperature wherein the seal strength levels off as the seal temperature is increased. The metallocene-catalyzed isotactic random copolymers provide heat-seal materials having ultimate seal strengths that are at least 30%, 50% or even 100% greater than those heat-seal materials prepared under similar film processing conditions from isotactic Ziegler-Natta catalysts using the same propylene and comonomer content.

The isotactic metallocene-catalyzed random copolymer resins used to form heat-seal films of the present invention exhibit low xylene solubles, usually less than 5% by weight, with less than 3% by weight and even less than 1% by weight being readily obtainable. The amount of xylene solubles is usually dependent upon the amount of ethylene or comonomer used, with higher amounts of comonomer resulting in higher xylene solubles. Even with higher amounts of ethylene, however, the xylene solubles are still quite low and well within acceptable limits for most applications.

This is an important improvement over conventional Ziegler-Natta random copolymers. Ziegler-Natta random copolymers tend to have much higher xylene solubles compared to the metallocene-catalyzed random copolymer materials of the present invention. In many applications, such as food packaging materials, high xylene solubles is undesirable. With higher ethylene or comonomer content, xylene solubles tends to increase in conventional Ziegler-Natta random copolymers. With metallocene-catalyzed random copolymers, heat-seal materials with lower xylene solubles can be produced while incorporating the same or even higher amounts of ethylene or alpha-olefin comonomer.

One problem associated with many heat-seal films is the tendency of the film to stick to itself at ambient temperatures, such as when the film is wound around itself on a roll. This is often referred to as "blocking." The lower a film's SIT, the more blocking problems tend to occur. Higher xylene solubles will also increase a film's tendency toward blocking. As a result, anti-blocking agents are oftentimes added to the polymer to reduce blocking of the film. The metallocene-catalyzed random copolymers, however, exhibit reduced blocking, reducing or eliminating the need for additional anti-blocking agents.

Improved optical properties of these heat-seal resins have also been observed, with the heat-seal films exhibiting less than 3%, 2%, 1% or even less than 0.5% haze. The films also exhibit high gloss with greater than 85% gloss, and even greater than 90% gloss at a 45° incident angle being achievable. This is a vast improvement over copolymer films prepared from conventional Ziegler-Natta catalysts, which can have haze as high as 10% or more and gloss as low as 50% or less.

In addition to the inherent improvements mentioned above, the heat seal films of the present invention display further improvements upon aging of the films. Whereas films from some Ziegler-Natta-catalyzed random copolymers will show deterioration of heat seal, optical, and blocking tendency properties over time, films from metallocene-catalyzed random copolymers more closely retain their properties after long exposures to time and/or exposures to higher temperatures as may be experienced in warehouse storage.

The following examples better serve to illustrate the invention.

EXAMPLE 1

Table 1 lists the basic resin characteristics for three metallocene-catalyzed isotactic propylene-ethylene random copolymer (mRCP) products, a metallocene-catalyzed isotactic homo-polypropylene (miPP) and two Ziegler-Natta-catalyzed propylene-ethylene random copolymers that were evaluated. Product 4 had the highest ethylene content at about 4% by weight of copolymer and exhibited the lowest DSC melting point (125° C.) for the metallocene-catalyzed polymers.

TABLE 1

| Resin Type | MiPP-15 MFR | MRCP-14 MFR 2% C2 | MRCP-8 MFR 3% C2 | MRCP-7 MFR 4% C2 | Z-N-6 MFR 7% C2 | Z-N-7 MFR 5% C2 |
|---|---|---|---|---|---|---|
| Product # | 1 | 2 | 3 | 4 | 5 | 6 |
| MFR, g/10 min | 12 | 14 | 8 | 7 | 6 | 7 |
| X-sol, % | 0.4 | 0.8 | 0.8 | 0.9 | 10 | 6.7 |
| Ethylene by NMR, wt. % (mole %) | 0 (0) | 1.9 (2.8) | 2.8 (4.2) | 3.5 (5.1) | 7.4 | 5.0 |
| Creep & Recovery @210° C. | | | | | | |
| ZSV, ×10³ Pa-s | 1.37 | 0.95 | 2.00 | 2.54 | 4.7 | 3.0 |
| $J_{or}$, ×10⁻⁴ Pa⁻¹ | 0.86 | 0.80 | 1.00 | 1.17 | 3.0 | 2.7 |
| Relaxation Time, sec | 0.12 | 0.08 | 0.20 | 0.30 | 1.4 | 0.8 |
| DSC | | | | | | |
| $T_{m2}$, ° C. | 148.4 | 136.7 | 130.4 | 125.0 | 121 | 133 |
| $\Delta H_{m2}$, J/g | 106.6 | 93.7 | 85.4 | 94.4 | 53 | 68 |
| $T_c$, ° C. | 102.0 | 93.6 | 88.6 | 81.6 | 76 | 90 |
| $\Delta H_c$, -J/g | 85.7 | 75.6 | 69.5 | 61.6 | 51 | 65 |

Cast films of 2 mil (0.05 mm) thickness were extruded using an Egan cast film line at 490° F. (254.4° C.) melt, 60° F. (15.6° C.) cast roll temperatures, and 100 fpm (30.5 m/min) line speed. After ambient aging for over a week, heat-seal and hot tack tests were conducted for the film samples using a Theller HT heatsealer at 60 psi sealing pressure, 1 second dwell time. Hot-tack measurements were taken after a 250 ms delay. Standard film optical, barrier and mechanical properties were also evaluated for the same film samples.

Figure 1:
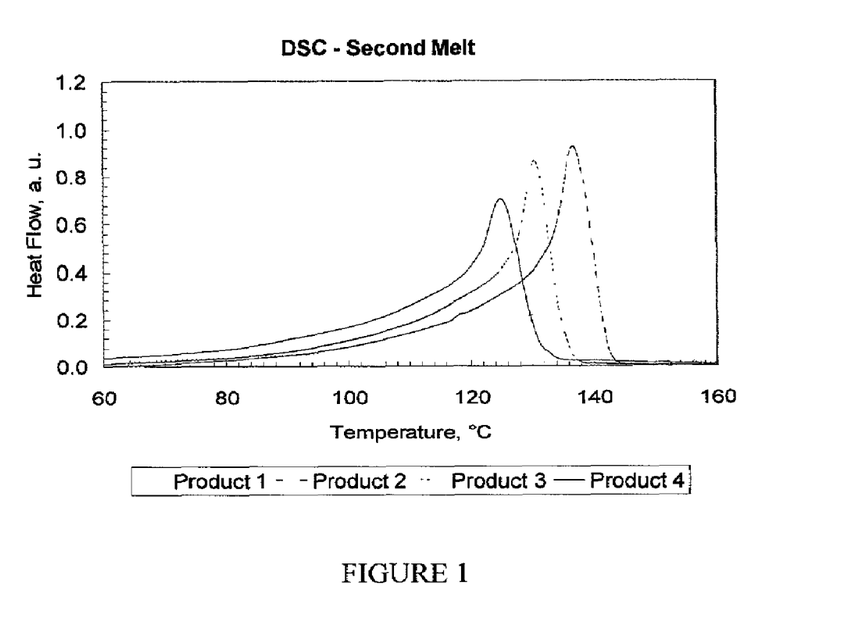
FIG. 1 is a plot showing the DSC melting points of various heat-seal materials.
Figure 2:
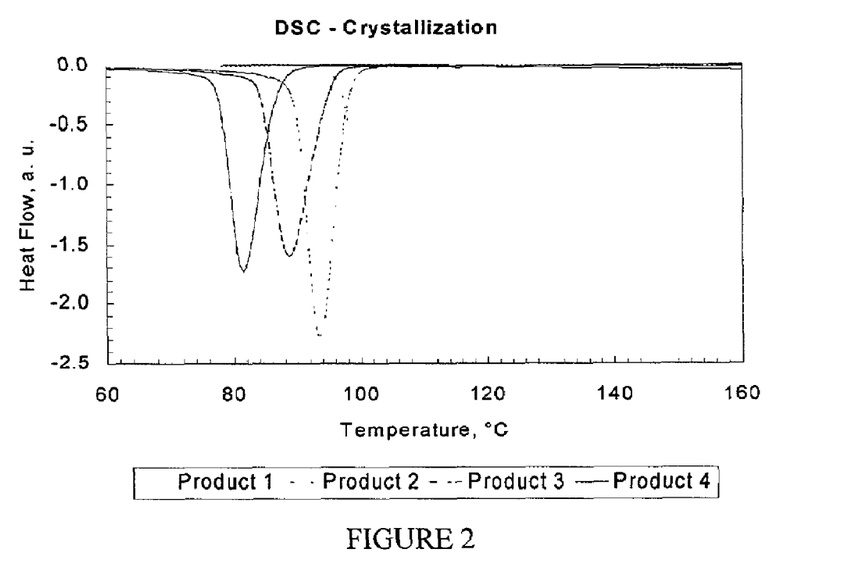
FIG. 2 is a plot showing the DSC crystallization temperatures of various heat-seal materials.

Referring to FIGS. 1 and 2, the DSC thermal characteristics are shown for each of the metallocene-based polymers used to produce cast films. As can be seen, with increasing levels of ethylene incorporation, the melting and crystallization peaks decreased.

Figure 3A:
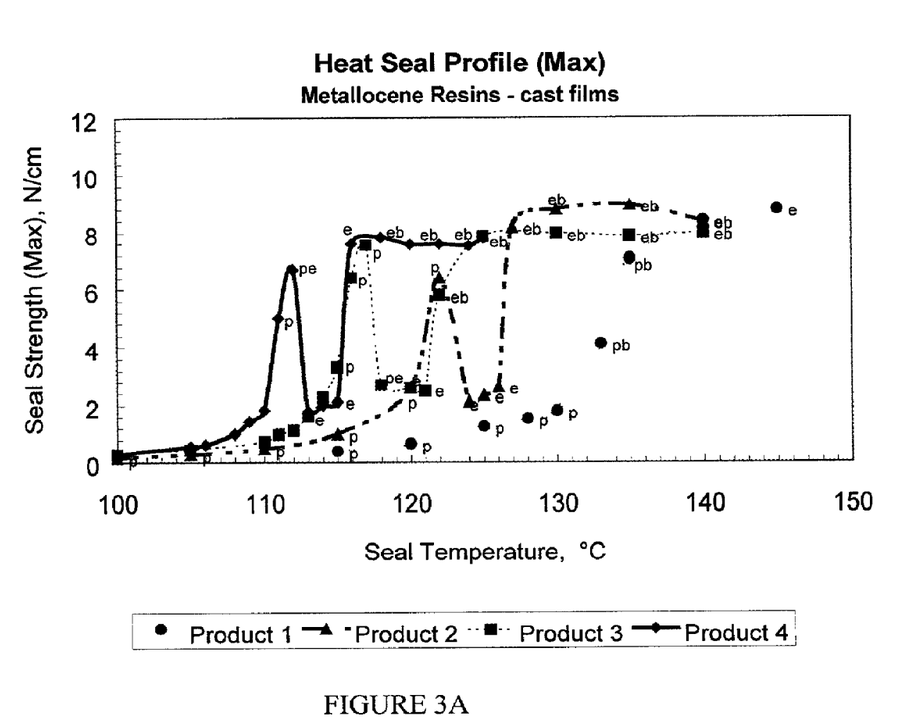
FIG. 3A is a plot showing the seal strength characteristics of various heat-seal materials formed into cast films from metallocene resins.
Figure 3B:
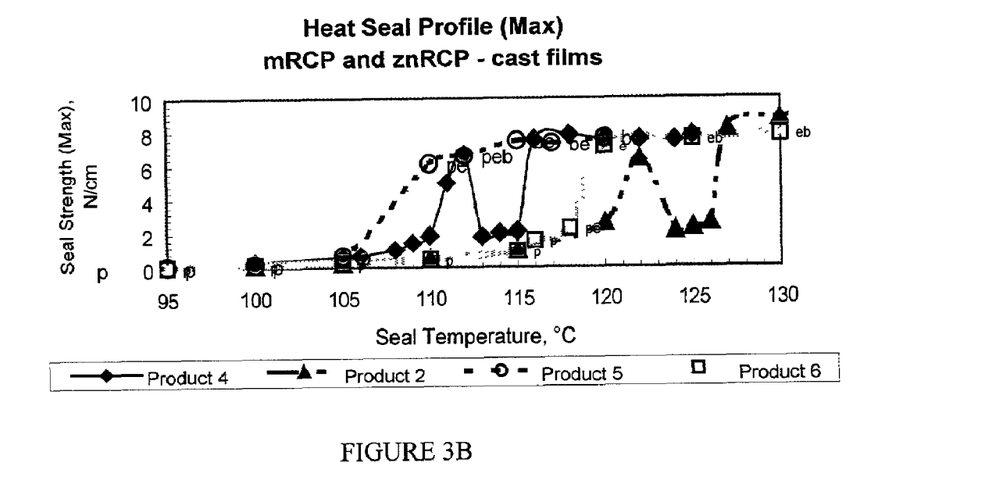
FIG. 3B is a plot showing the seal strength characteristics of various heat-seal materials formed into cast films from metallocene and Ziegler-Natta produced propylene-ethylene copolymers.

FIGS. 3A and 3B show the heat-sealability curves for the evaluated cast films. FIG. 3A illustrates the metallocene-catalyzed polymers, while FIG. 3B compares both metallocene and Ziegler-Natta copolymers. Failure modes for heat-seal are denoted by peel (p), elongation (e), break (b), material break (m), or their combination.

Table 2 sets forth the average seal initiation temperatures (SIT's), defined as the seal temperature where the seal strength equals 200 g/in (0.77 N/cm) for the different cast film metallocene and Ziegler-Natta copolymer products. SIT's where the seal strength equals 500 g/in (1.93 N/cm) for the different metallocene and Ziegler-Natta copolymer products are also given.

TABLE 2

| Resin Type | MiPP-15 MFR | MRCP-14 MFR 2% C2 | MRCP-8 MFR 3% C2 | MRCP-7 MFR 4% C2 | Z-N-6 MFR 7% C2 | Z-N-7 MFR 5% C2 |
|---|---|---|---|---|---|---|
| Product # | 1 | 2 | 3 | 4 | 5 | 6 |
| SIT (° C.) at Seal Strength 0.77 N/cm | 122 | 114.4 | 110.5 | 107.5 | 105.3 | 115.2 |
| SIT (° C.) at Seal Strength 1.93 N/cm | 130.5 | 119.4 | 113.7 | 110.2 | 106.6 | 118 |

Figure 4:
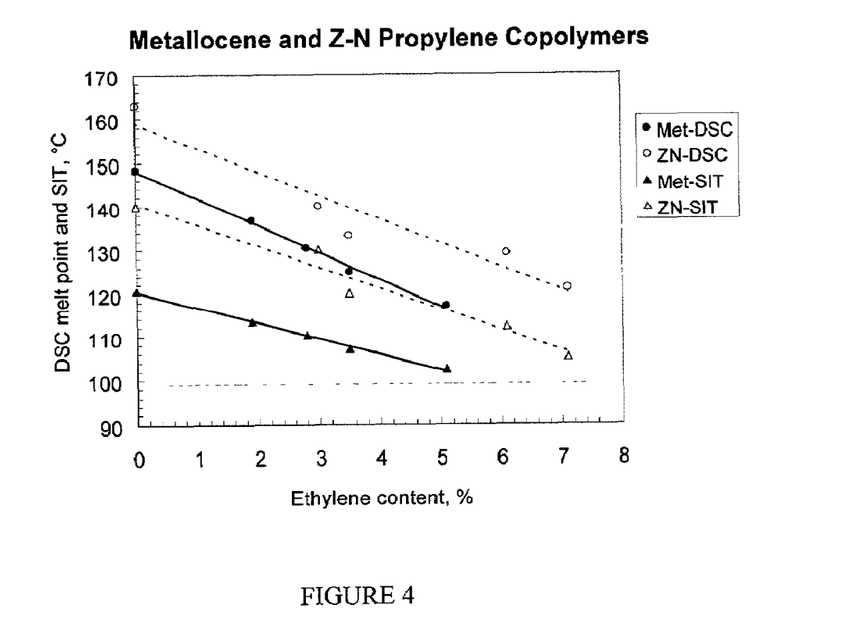
FIG. 4 is a plot of DSC melting point and seal initiation temperatures for various propylene-ethylene copolymer heat-seal materials as a function of ethylene content.

FIG. 4 shows the correlation between ethylene content with the DSC melting point and with SIT for both the metallocene and Z-N copolymer products. As seen in FIG. 4, the MRCP materials exhibit significantly lower SITs compared to the Ziegler-Natta copolymer films having the same or lower ethylene content.

Figure 5A:
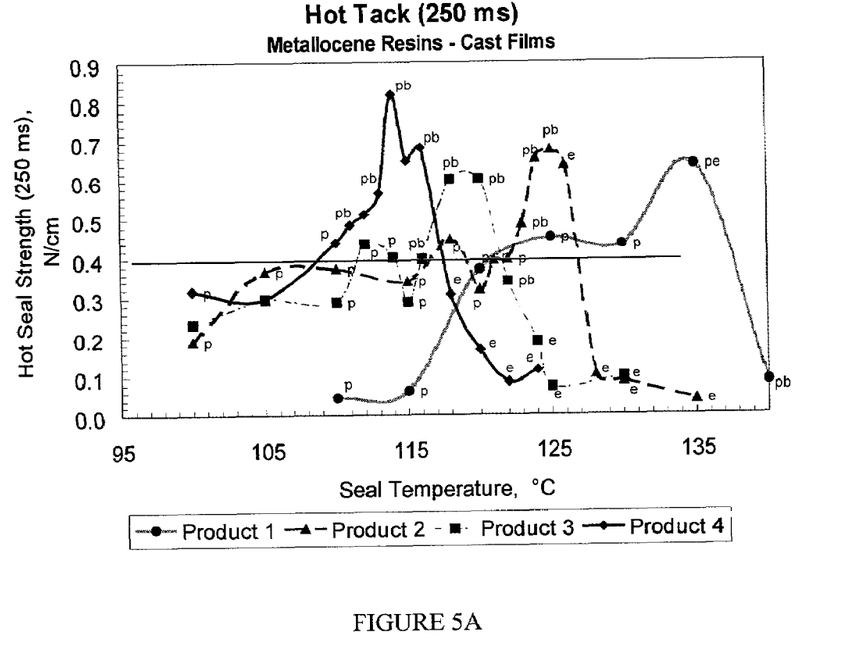
FIG. 5A is a plot of hot tack performance of various heat-seal materials formed into cast films from metallocene resins.
Figure 5B:
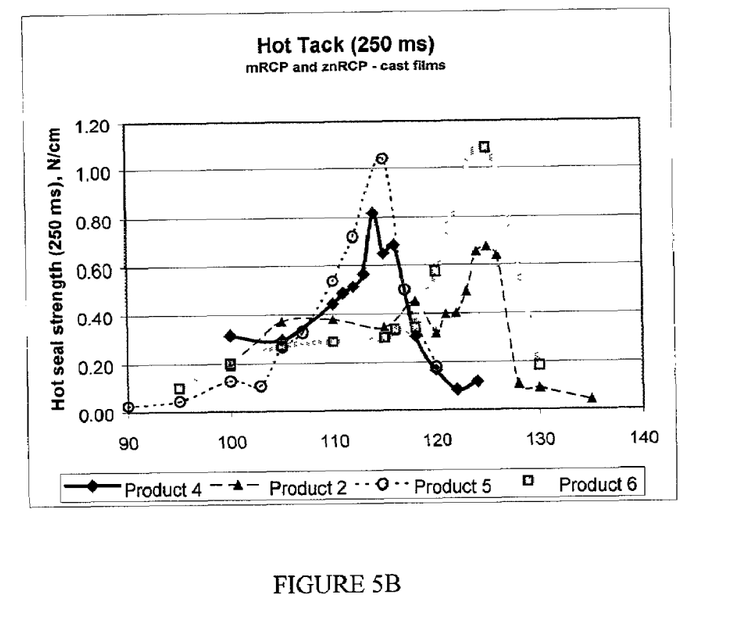
FIG. 5B is a plot of hot-tack performance of various heat-seal materials formed into cast films from propylene-ethylene copolymers.

FIGS. 5A and 5B show the hot tack performance for the different cast films. FIG. 5A shows the hot tack values for the metallocene products, and FIG. 5B compares hot tack values for metallocene and Ziegler-Natta copolymers. Referring to FIG. 5A, hot tack values above 0.4 N/cm were generally acceptable as heat-seal materials.

FIG. 5B illustrates the improved hot tack performance of the metallocene copolymers over the Ziegler-Natta copolymers. As can be seen, the metallocene-produced heat seal materials had comparable hot-tack seal strengths with lower ethylene content. Compared to the Ziegler-Natta copolymers, the metallocene-produced heat seal materials of the same ethylene content had a broader temperature range and exhibited lower temperatures for hot tack values above 0.4 N/cm.

Table 3 lists film optical, barrier and mechanical properties for the metallocene cast film products evaluated. Properties for Ziegler-Natta products that were evaluated are also added for a comparison. Product 7 was a Ziegler-Natta isotactic propylene homopolymer. All barrier properties presented herein were measured according to ASTM E-96. Stiffness, tensile strength and elongation were all measured according to ASTM D-882. Haze properties were all measured according to ASTM D-1003, and gloss was measured according to ASTM D-2457. The metallocene copolymers exhibited higher moduli than the Ziegler-Natta random copolymer products.

TABLE 3

| Resin Type | MiPP-15 MFR | MRCP-14 MFR 2% C2 | MRCP-8 MFR 3% C2 | MRCP-7 MFR 4% C2 | Z-N-6 MFR 7% C2 | Z-N iPP |
|---|---|---|---|---|---|---|
| Product # | 1 | 2 | 3 | 4 | 5 | 7 |
| MFR, g/10 min | 12 | 14 | 8 | 7 | 6 | 8 |
| X-sol, % | 0.4 | 0.8 | 0.8 | 0.9 | 9.9 | 3.0 |
| C2 by NMR, wt. % | 0.0 | 1.9 | 2.8 | 3.5 | 7.4 | — |
| *Optical Property* | | | | | | |
| Haze, % | 0.2 | 0.1 | 0.1 | 0.1 | 9.0 | 8.0 |
| Gloss @ 45°, % | 94.3 | 94.4 | 94.9 | 94.5 | 49.9 | 69.0 |
| *Barrier Property* | | | | | | |
| WVTR, gm/m2/day/25 mm | 12 | 12 | 14 | 14 | — | — |
| OTR, cc/m2/day/25 mm | 4080 | 4163 | 5329 | 5865 | — | — |
| *Mechanical Property* | | | | | | |
| Dart Drop Impact, gm | 325 | 400 | 439 | 338 | 604 | 407 |
| Tear Ratio TD/MD | 1.3 | 1.2 | 3.0 | 2.0 | — | 3.9 |
| *MD* | | | | | | |
| 1% Secant Modulus, MPa | 708 | 599 | 484 | 427 | 261 | 600 |
| Tensile @ Yld, MPa | 20 | 16 | 17 | 15 | 13 | 25 |
| Tensile @ Break, MPa | 54 | 51 | 54 | 54 | 49 | 55 |
| Elong @ Yld, % | 4 | 6 | 7 | 8 | 18 | 3 |
| Elong @ Break, % | 845 | 862 | 794 | 766 | 729 | 746 |
| Elmendorf Tear, gm | 92 | 116 | 116 | 216 | 96 | 62 |
| *TD* | | | | | | |
| 1% Secant Modulus, MPa | 649 | 589 | 495 | 425 | 262 | 539 |
| Tensile @ Yld, MPa | 19 | 18 | 15 | 14 | 13 | 25 |
| Tensile @ Break, MPa | 46 | 46 | 47 | 46 | 43 | 50 |
| Elong @ Yld, % | 4 | 5 | 7 | 6 | 17 | 3 |
| Elong @ Break, % | 858 | 865 | 882 | 855 | 950 | 916 |
| Elmendorf Tear, gm | 120 | 144 | 352 | 432 | No tear | 241 |

Figure 6:
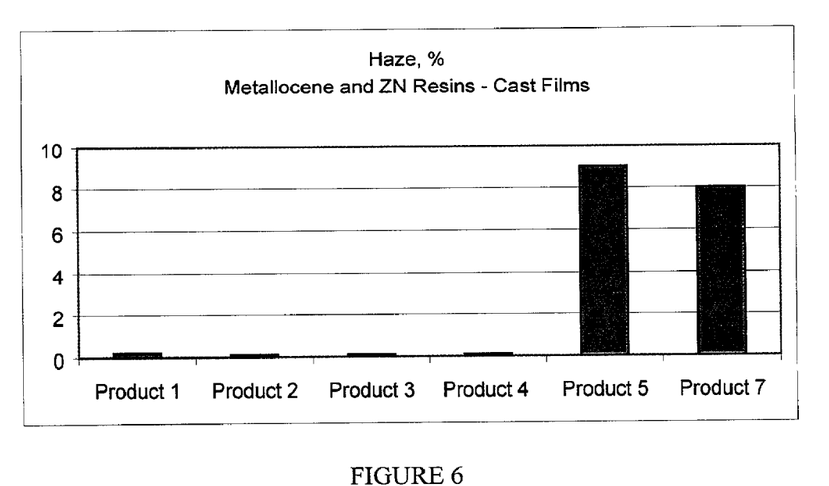
FIG. 6 is a graph showing the haze properties of various cast films prepared from both metallocene and Ziegler-Natta-catalyzed copolymer resins.
Figure 7:
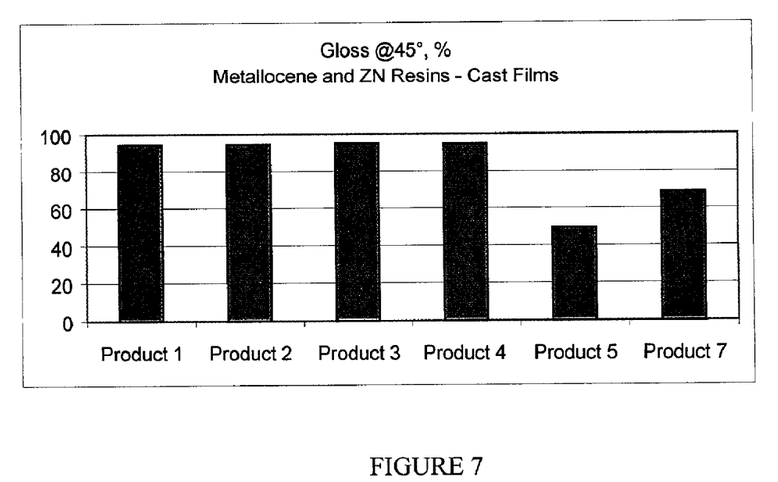
FIG. 7 is a graph showing the gloss properties of various cast films prepared from both metallocene and Ziegler-Natta-catalyzed copolymer resins.

Referring to FIGS. 6 and 7, the metallocene-based random copolymers exhibited significantly better optical properties than those random copolymers prepared from Ziegler-Natta catalysts. The metallocene-based products exhibited haze at less than 0.5%. More specifically, for the metallocene-based random copolymers, the haze was 0.1% for each sample tested. Furthermore, gloss for the metallocene random copolymers was greater than 90%.

EXAMPLE 2

Biaxially-oriented films were evaluated using various resins. The resins evaluated were used as skin layers in two-layer films that were coextruded with a polypropylene core layer. FINA® 3277 polypropylene, available from ATOFINA Petrochemicals, Inc., having a 1.8 MFR was used as a core layer for those films evaluated. For comparison, films utilizing Ziegler-Natta propylene-ethylene copolymers and propylene-butene copolymers and propylene-ethylene-butene terpolymers, as well metallocene isotactic propylene homopolymer as skin layers were also used.

Each of the films was oriented with a maximum machine direction orientation (MDO) draw ratio of 5:1, and a maximum transverse direction orientation (TDO) draw ratio of greater than 8:1. The films prepared had a total film gauge of approximately 0.65 mil (17 μm) with a skin layer thickness of 0.05 mil (~1 μm). Each film sample was tested for optical, heat-seal and hot tack properties.

Table 4 sets forth the properties of the resins used. The metallocene-based samples exhibited significantly low levels of xylene solubles content in contrast to the materials prepared from conventional Ziegler-Natta catalysts. Products 2 and 3 were challenging among the materials processed. These materials were prone to sticking on cast roll surfaces even at lowered processing temperatures. The sticky nature of the these materials, possibly due to the extremely high levels of xylene solubles content, may have caused the haze and gloss values to be higher as shown in the following section, making them less desirable for some film applications.

TABLE 4

| Sample Label | Ziegler-Natta Copolymer Z-N-5 MFR, 7% C2 | Z-N Butene Copolymer 8 MFR, C4 Copolymer | Z-N C2, C4 Terpolymer 8 MFR, C2 C4 Terpolymer | Metallocene Copolymer MRCP-4 MFR, 5% C2 | Metallocene Homopolymer MiPP-11 MFR |
|---|---|---|---|---|---|
| Product # | 1 | 2 | 3 | 4 | 5 |
| MFR, g/10 min | 5.2 | 7.7 | 7.6 | 3.5 | 11.0 |
| X-sol, % | <12 | 21.6 | 19.7 | 2.3 | 0.4 |
| *NMR* | | | | | |
| C2, wt. % | 7.0 | — | 5.7 | 5.0 | 0 |
| C4, wt. % | 0 | 16.8 | 10.2 | 0 | 0 |
| *DSC* | | | | | |
| $T_{m2}$, °C | 123.7 | 116.4 | 134.0 | 121.0 | 153.0 |
| $\Delta H_{m2}$, J/g | 79.9 | 63.1 | 76.3 | 68.2 | 117.6 |
| $T_{C1}$ °C | 77.6 | 70.3 | 89.6 | 82.0 | 112.3 |
| $\Delta H_C$, -J/g | 53.1 | 44.1 | 54.5 | 52.5 | 88.1 |

TABLE 4-continued

| Sample Label | Ziegler-Natta Copolymer Z-N-5 MFR, 7% C2 | Z-N Butene Copolymer 8 MFR, C4 Copolymer | Z-N C2, C4 Terpolymer 8 MFR, C2 C4 Terpolymer | Metallocene Copolymer MRCP-4 MFR, 5% C2 | Metallocene Homopolymer MiPP-11 MFR |
|---|---|---|---|---|---|
| Creep & Recovery @ 210° C. | | | | | |
| ZSV, ×10$^3$ Pa-s | 4.6 | 2.1 | 2.3 | 5.2 | 1.3 |
| J$_{or}$, ×10$^{-4}$ Pa$^{-1}$ | 3.6 | 1.5 | 1.7 | 1.5 | 0.8 |
| Relax. Time, s | 1.6 | 0.3 | 0.4 | 0.8 | 0.1 |

Figure 8:
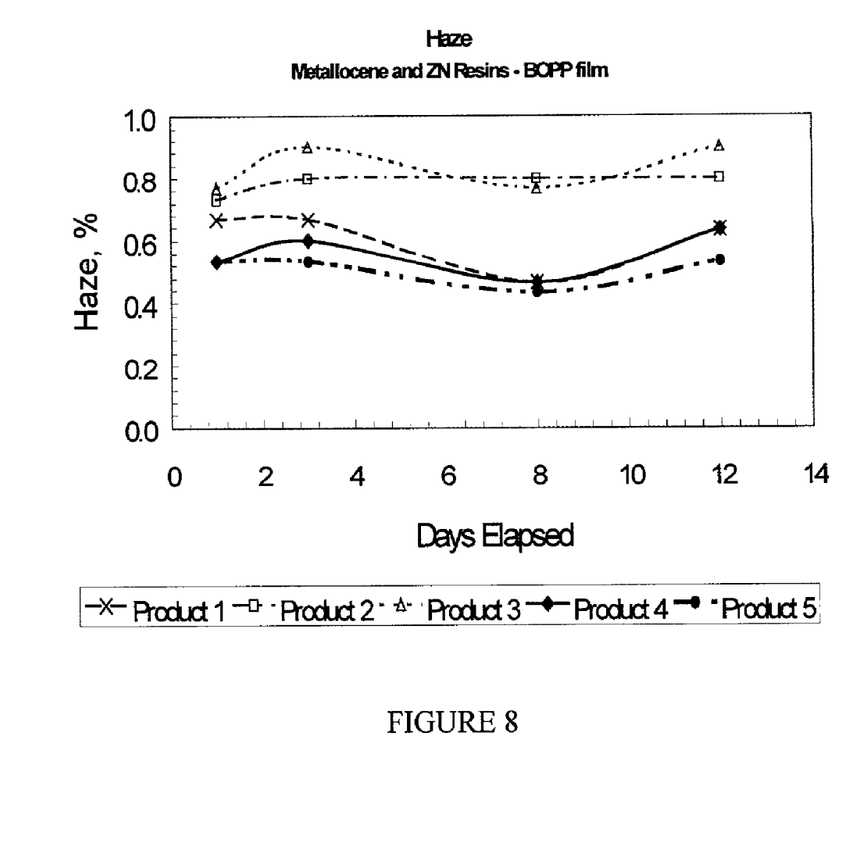
FIG. 8 is a plot of haze properties of various heat-seal resin skin layers on oriented polypropylene films.
Figure 9:
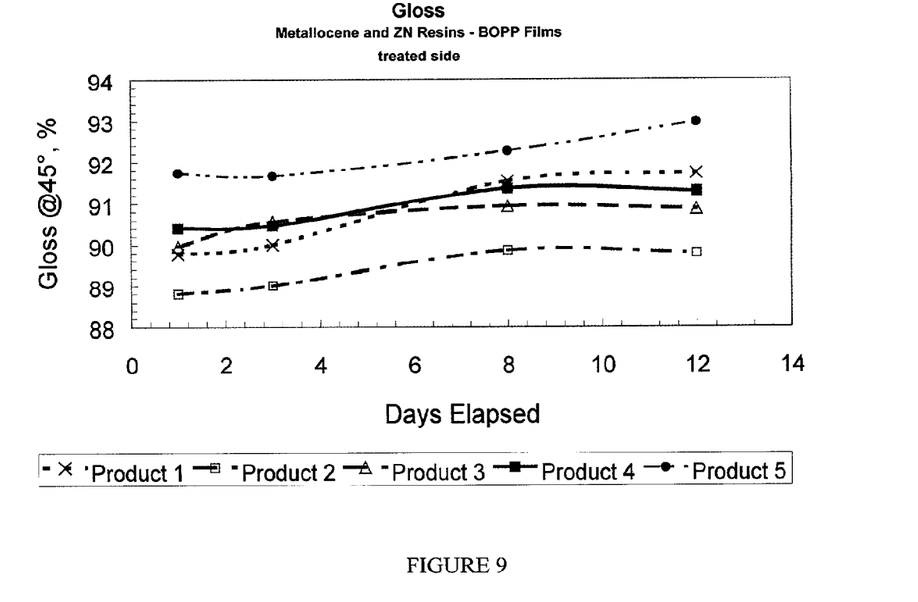
FIG. 9 is a plot of gloss properties of various heat-seal resin skin layers on oriented polypropylene films.

FIGS. 8 and 9 set forth the optical properties of the BOPP films evaluated. All the film samples showed acceptable haze and gloss, even for the aged films.

Figure 10:
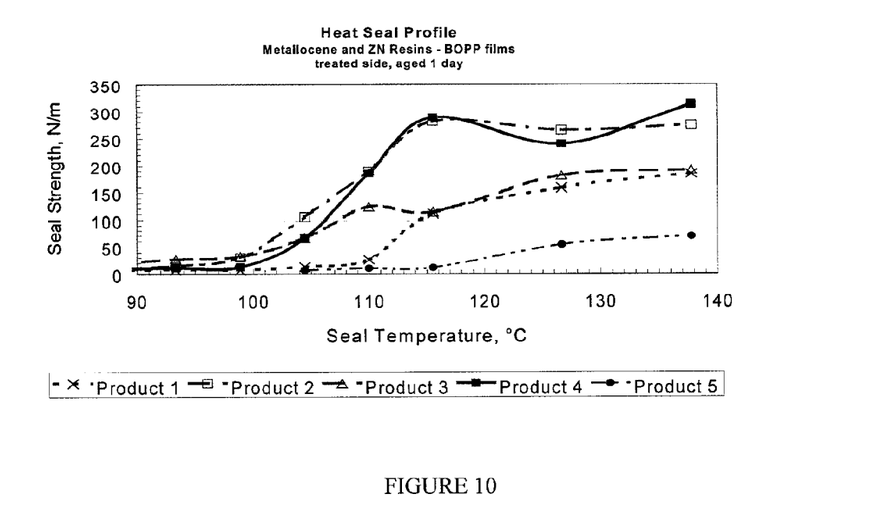
FIG. 10 is a plot showing the seal strength characteristics of various heat-seal skin layers on oriented polypropylene films after one day of aging.
Figure 11:
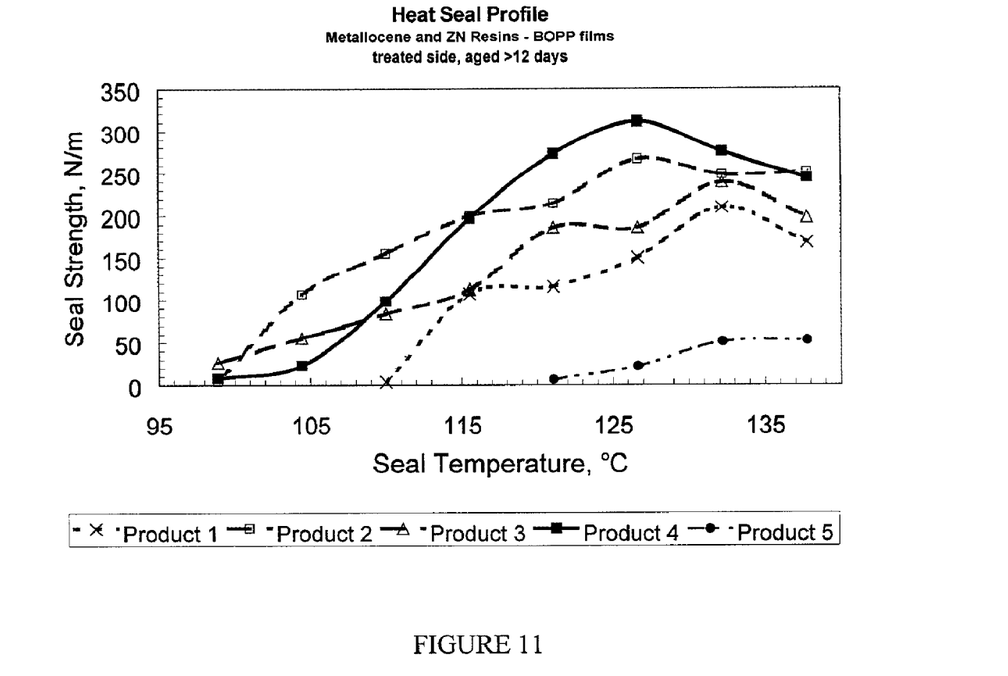
FIG. 11 is a plot showing the seal strength characteristics of various heat-seal skin layers on oriented polypropylene films after several days of aging.

FIGS. 10 and 11 show heat-seal properties for the BOPP samples with various skin layer resins. Seal initiation temperatures are presented in Table 5, and were defined at a strength of 200 g/inch (0.77 N/cm), measured at 20 psi sealing pressure and 0.5 second dwell time. The metallocene random copolymer (MRCP) and the propylene-butene copolymer (Product 2) exhibited high plateau seal strengths, while the Ziegler-Natta propylene-ethylene copolymer (Product 1) and the propylene-ethylene-butene terpolymer (Product 3) showed low plateau seal strengths. The MRCP (Product 4) with an ethylene content of 5% displayed a comparable SIT to Products 2 and 3 among the one-day aged films.

TABLE 5

| Sample Label | Ziegler-Natta Copolymer Z-N-5 MFR, 7% C2 | Z-N Butene Copolymer 8 MFR, C4 Copolymer | Z-N C2-C4 Terpolymer 8 MFR, C2, C4 Terpolymer | Metallocene Copolymer MRCP-4 MFR, 5% C2 | Metallocene Homopolymer MiPP-11 MFR |
|---|---|---|---|---|---|
| Product # | 1 | 2 | 3 | 4 | 7 |
| SIT (° C.) at 0.77 N/cm Day 1 | 113 | 102 | 105 | 105 | >140 |
| SIT (° C.) at 0.77 N/cm >Day 12 | 114 | 103 | 109 | 109 | >140 |
| Plateau Seal-Strength Range (N/cm) | 1-2 | 2.5-3.5 | 1-2 | 2.5-3.5 | 0.5-1 |

Figure 12:
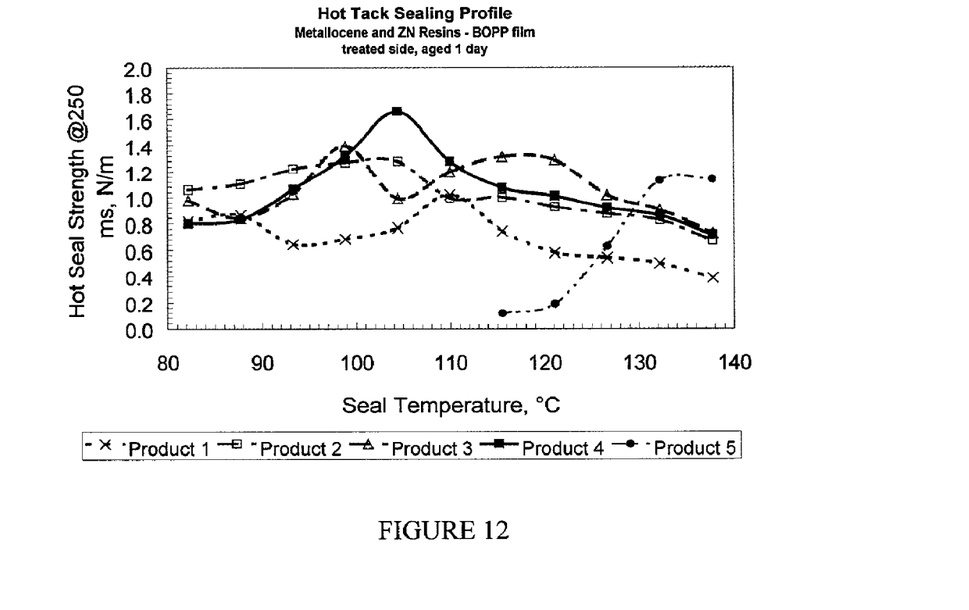
FIG. 12 is plot showing the hot tack seal strength performance of various oriented heat-seal skin layers after one day.
Figure 13:
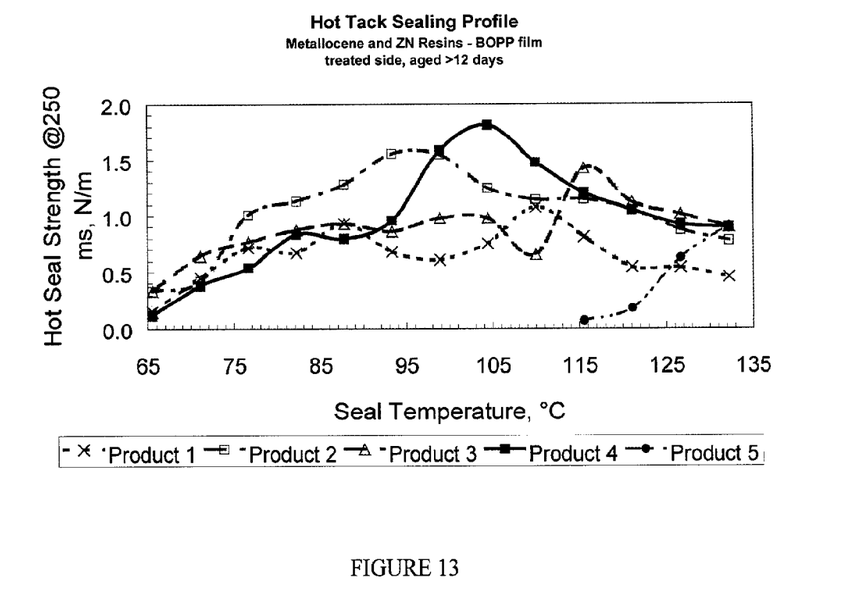
FIG. 13 is a plot showing the hot tack seal strength performance of various oriented heat-seal skin layers after twelve days.

FIGS. 12 and 13 compare hot tack properties for BOPP films with the various skin layer resins at day one and after 12 days. Compared to the Ziegler-Natta copolymer, the MRCP exhibited significantly better hot tack performance. Hot-tack measurements were measured at a 20 psi sealing pressure, a 0.5 second dwell time and a 250 ms delay.

EXAMPLE 3

Figure 14:
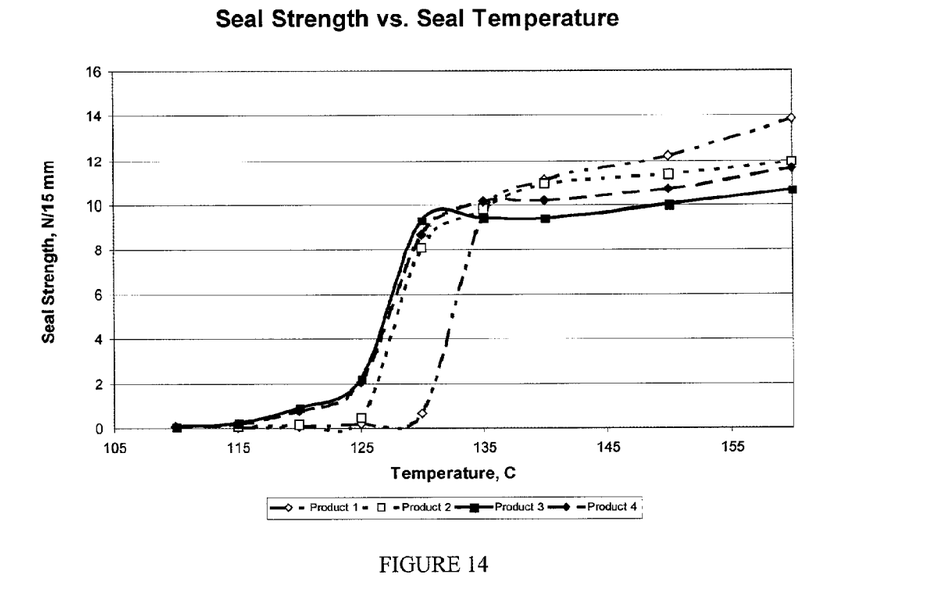
FIG. 14 is a plot showing the seal strength characteristics of various heat-seal materials formed into cast films from metallocene and Ziegler-Natta produced propylene-ethylene copolymers at different seal temperatures.

Table 6 lists the basic resin characteristics and properties for cast films prepared from two metallocene-catalyzed isotactic propylene-ethylene random copolymer resins and two Ziegler-Natta-catalyzed propylene-ethylene random copolymers resins that were evaluated. The cast films were 1.0 mil (0.025 mm) thick and were extruded using a cast film line consisting of a 65 mm extruder and a 0.5 m wide die and casting roll take-up unit. Samples were run at 428° F. (220° C.) melt, 86° F. (30° C.) cast roll temperatures, and 98 fpm (30 m/min) line speed. Heat-seal strength tests at different seal temperatures were conducted for the film samples within 24 hours of casting at ambient conditions. Heat seals were made on a heatsealing unit at 28 psi (2 Kg/cm$^2$) sealing pressure and a one second dwell time. The results are presented in FIG. 14. Standard film optical and blocking properties were also evaluated for the same film samples. Blocking was measured as the peeling force between two film strips measuring 20 cm long by 10 cm wide that were placed together under a weight of 40 kg at 50° C. for the times indicated in Table 6.

TABLE 6

| | Ziegler-Natta C3C2 Copolymer | Ziegler-Natta C3C2 Copolymer | Metallocene C3C2 Copolymer | Metallocene C3C2 Copolymer |
|---|---|---|---|---|
| Product No. | 1 | 2 | 3 | 4 |
| Melt Flow. g/10 min | 6.4 | 5.2 | 6.8 | 7.4 |
| Xylene Solubles., Wt. % | 6.9 | 8.2 | 0.9 | 0.8 |
| % Ethylene, Wt. % | 3.5 | 5.2 | 2.6 | 1.9 |
| Melting Point, ° C. | 133 | 130 | 126 | 131 |
| Haze, % | | | | |
| Initial | 2.7 | 3.8 | 2.6 | 2.6 |
| After 3 days/80° C. | 39 | 42 | 3.8 | 3.6 |
| Gloss, % | 96 | 77 | 114 | 105 |
| Blocking Tendency @ 0.2 Kg/cm$^2$, Peeling Force | | | | |

TABLE 6-continued

|  | Ziegler-Natta C3C2 Copolymer | Ziegler-Natta C3C2 Copolymer | Metallocene C3C2 Copolymer | Metallocene C3C2 Copolymer |
|---|---|---|---|---|
| in N/10 cm |  |  |  |  |
| 1 day/50° C. | 1.14 | 0.97 | 0 | 0 |
| 3 days/50° C. | 1.74 | 1.55 | 0 | 0 |
| 7 days/50° C. | 2.92 | 3.59 | 0.12 | 0.14 |

As can be seen from Table 6, the metallocene-based random copolymer cast films exhibited significantly lower haze after aging compared to the Ziegler-Natta-based films, which showed considerably more haze after aging. Blocking tendencies were also much lower for the metallocene-based random copolymer cast films compared to the Ziegler-Natta-based films.

The invention has several advantages over the prior art. The metallocene-catalyzed random copolymer resins produce heat-seal films having lower seal initiation temperatures and improved hot-tack performance. The resins used for preparing heat-seal films in accordance with the invention also exhibit greater ultimate seal strength values than heat-seal films prepared from random copolymer resins prepared from conventional Ziegler-Natta catalysts incorporating the same amount or higher ethylene or alpha olefin comonomer. Further, in addition to providing better heat-seal performance, the metallocene-catalyzed random copolymers have less low molecular weight and atactic material, and produce very low xylene solubles, much lower than conventional Ziegler-Natta resins employing the same or greater amounts of the ethylene or alpha olefin comonomer. This is important, particularly where high xylene soluble content is undesirable, such as in the manufacturing of film for packaging foodstuffs. This allows more comonomer to be used while still maintaining low or acceptable xylene solubles. The metallocene-produced random copolymers used for the heat seal films also provide improved optical properties, with lower haze and greater gloss than conventional random copolymers prepared with Ziegler-Natta catalysts. The metallocene-catalyzed random copolymers also exhibit less tendency for blocking, reducing or eliminating the need for anti-blocking agents. Furthermore, the stability of these properties over time and exposure to heat is improved compared to Ziegler-Natta products.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A heat-seal polymer film comprising a layer of film wherein said film consists essentially of metallocene catalyzed, isotactic ethylene-propylene copolymer having a random comonomer distribution, the ethylene present in the ethylene-propylene copolymer is in an amount of from 1% to 15% by weight wherein the film has a seal initiation temperature of 80° C. to 125° C. defined at a seal strength of 200 g/inch.

2. The heat-seal polymer film of claim 1, wherein the film has less than 3% haze.

3. The heat-seal polymer film of claim 1, wherein the film has greater than 85% gloss at a 45° incident angle.

4. The heat-seal polymer film of claim 1, wherein the random copolymer has a xylene solubles content of less than 5% by weight.

5. The heat-seal polymer film of claim 1, wherein the layer of film is a cast film.

6. The heat-seal polymer film of claim 1, wherein the layer of film is an oriented film.

7. The heat-seal polymer film of claim 1, wherein the random copolymer has a seal initiation temperature from 110° C. to 125° C.

8. The heat-seal polymer film of claim 1, wherein the heat-seal film has an ultimate seal strength that is at least 30% greater than a heat-seal film prepared under similar conditions from a random copolymer of propylene and ethylene using a Ziegler-Natta catalyst useful in the polymerization of isotactic polypropylene.

9. The heat-seal polymer film of claim 1, wherein the heat-seal film is a cast film and provides a hot-tack seal strength above 0.4 N/cm at a temperature range of from 60° C. to 130° C.

10. A multi-layer polymer film comprising a polyolefin core layer and at least one heat-seal layer, wherein said at least one heat-seal layer comprises a film that consists essentially of a metallocene catalyzed, isotactic ethylene-propylene copolymer having a random comonomer distribution, the ethylene present in the ethylene-propylene copolymer is in an amount of from 1% to 15% by weight, wherein the at least one heat-seal layer has a seal initiation temperature of 80° C. to 125° C. defined at a seal strength of 200 g/inch.

11. The multi-layer polymer film of claim 10, wherein the core layer and heat-seal layer are coextruded together.

12. The multi-layer polymer film of claim 10, wherein the heat-seal layer has a thickness that is less than the thickness of the core layer.

13. The multi-layer polymer film of claim 10, wherein the heat-seal layer has a thickness that is 20% or less than the thickness of the core layer.

14. The multi-layer polymer film of claim 10, wherein the heat-seal layer provides an ultimate seal strength that is at least 30% greater than a heat-seal layer prepared under similar conditions from a random copolymer of propylene and ethylene using a Ziegler-Natta catalyst useful in the polymerization of isotactic polypropylene.

15. The multi-layer polymer film of claim 10, wherein the random copolymer has a seal initiation of from 110° C. to 125° C.

16. The multi-layer polymer film of claim 10, wherein the heat-seal layer is a cast film layer and provides a hot-tack seal strength above 0.4 N/cm at a temperature range of from 60° C. to 130° C.

17. A material for use in heat-seal applications, said material comprises a film wherein said film consists essentially of a metallocene catalyzed, isotactic ethylene-propylene copolymer having a random comonomer distribution, the ethylene present in the ethylene-propylene copolymer is in an amount of from 1% to about 15% by weight, wherein the film has a seal initiation temperature of 80° C. to 125° C. defined at a seal strength of 200 g/inch.

18. The material of claim 17, wherein the material provides a heat-seal film having an ultimate seal strength that is at least 30% greater than a heat-seal film prepared under similar conditions from a copolymer of propylene and ethylene using a Ziegler-Natta catalyst useful in the polymerization of isotactic polypropylene.

19. The material of claim 17, wherein the material provides a heat-seal film having a seal initiation temperature of from 110° C. to 125° C. defined at a seal strength of 200 g/inch.

20. The material of claim 17, wherein the material provides a heat-seal film having less than 3% haze.

21. The material of claim 17, wherein the material provides a heat-seal film having greater than 85% gloss at a 45° incident angle.

22. The material of claim 17, wherein the random copolymer has a xylene solubles content of less than 5% by weight.

23. The material of claim 17, wherein the random copolymer has a seal initiation of from 110° C. to 125° C.

24. The material of claim 17, wherein the material provides a cast heat-seal film having a hot-tack seal strength above 0.4 N/cm at a temperature range of from 60° C. to 130° C.

25. A method of forming the heat-seal film of claim 1 comprising: providing a metallocene catalyzed, isotactic ethylene-propylene copolymer having a random comonomer distribution, the ethylene present in the ethylene-propylene copolymer is in an amount of from 1% to 15% by weight and forming the copolymer into a layer of film.

* * * * *